(12) United States Patent
Tanaka et al.

(10) Patent No.: US 11,557,432 B2
(45) Date of Patent: Jan. 17, 2023

(54) CERAMIC ELECTRONIC DEVICE, CIRCUIT SUBSTRATE AND MANUFACTURING METHOD OF CERAMIC ELECTRONIC DEVICE

(71) Applicant: TAIYO YUDEN CO., LTD., Tokyo (JP)

(72) Inventors: Takehiro Tanaka, Takasaki (JP); Kotaro Mizuno, Takasaki (JP); Yusuke Kowase, Takasaki (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 43 days.

(21) Appl. No.: 16/852,321

(22) Filed: Apr. 17, 2020

(65) Prior Publication Data

US 2020/0335280 A1 Oct. 22, 2020

(30) Foreign Application Priority Data

Apr. 22, 2019 (JP) .............................. JP2019-081284
Feb. 3, 2020 (JP) .............................. JP2020-016251

(51) Int. Cl.
*H01G 4/008* (2006.01)
*H01G 4/30* (2006.01)
(Continued)

(52) U.S. Cl.
CPC ............. *H01G 4/008* (2013.01); *H01G 4/012* (2013.01); *H01G 4/232* (2013.01); *H01G 4/248* (2013.01); *H01G 4/30* (2013.01)

(58) Field of Classification Search
CPC ........ H01G 4/30; H01G 4/012; H01G 4/1227; H01G 4/2325; H01G 4/008; H01G 4/0085;
(Continued)

(56) References Cited

U.S. PATENT DOCUMENTS 7,161,795 B1 * 1/2007 Megherhi ............. C04B 35/462
156/89.12
2004/0256603 A1 * 12/2004 Celik ................... H01G 4/0085
252/500

(Continued)

FOREIGN PATENT DOCUMENTS

JP 2001210545 A 8/2001
JP 2014241453 A 12/2014

*Primary Examiner* — Michael P McFadden
(74) *Attorney, Agent, or Firm* — Law Office of Katsuhiro Arai (57) ABSTRACT

A ceramic electronic device includes: a multilayer chip having a structure in which each of dielectric layers and each of internal electrode layers are alternately stacked; and external electrodes provided on end faces of the multilayer chip, wherein a main component of the external electrodes is a first metal, wherein the internal electrode layers include the first metal and a second metal of which a melting point is higher than that of the first metal, wherein a diffusion coefficient of the first metal with respect to the second metal is larger than that of the second metal with respect to the first metal, wherein a number of a cavity in a range of 10 numbers of the internal electrode layers that are next to each other and are connected to a same external electrode of the first external electrode and the second external electrode is 1 or less.

5 Claims, 10 Drawing Sheets

(51) Int. Cl.
*H01G 4/232* (2006.01)
*H01G 4/012* (2006.01)
*H01G 4/248* (2006.01)

(58) Field of Classification Search
CPC .......... H01G 4/12; H01G 4/224; H01G 4/228; H01G 4/232; H01G 4/248; H01G 2/065; H01G 4/33; H01G 13/00
See application file for complete search history.

(56) References Cited

U.S. PATENT DOCUMENTS

| | | | |
|---|---|---|---|
| 2005/0088803 A1* | 4/2005 | Umeda | C04B 35/63 361/321.2 |
| 2005/0128683 A1* | 6/2005 | Watanabe | C04B 35/62685 361/321.4 |
| 2016/0093442 A1 | 3/2016 | Nagamoto | |
| 2018/0301283 A1* | 10/2018 | Tomizawa | H01G 4/12 |

\* cited by examiner

CERAMIC ELECTRONIC DEVICE, CIRCUIT SUBSTRATE AND MANUFACTURING METHOD OF CERAMIC ELECTRONIC DEVICE

CROSS-REFERENCE TO RELATED APPLICATION

This application is based upon and claims the benefit of priority of the prior Japanese Patent Application No. 2019-081284, filed on Apr. 22, 2019 and Japanese Patent Application No. 2020-016251, filed on Feb. 3, 2020, the entire contents of which are incorporated herein by reference.

FIELD

A certain aspect of the present invention relates to a ceramic electronic device, a circuit substrate and a manufacturing method of the ceramic electronic device.

BACKGROUND

Ceramic electronic devices such as multilayer ceramic capacitors have a high capacity density. Therefore, the ceramic electronic devices are widely used for electronic devices. Generally, Cu (copper) is used as external electrodes. A favorable sintering temperature of Cu is different from a favorable sintering temperature of dielectric layers. Therefore, exposed parts of internal electrodes are coated with paste Cu material and the paste Cu material is fired, after a ceramic main body is sintered.

SUMMARY OF THE INVENTION

It is though that thicknesses of the external electrodes are reduced, for the purpose of improving a capacity volume density of the ceramic electronic device (for example, see Japanese Patent Application Publication No. 2001-210545). However, in the ceramic electronic device in which Ni internal electrode layers and Cu external electrodes are used, a large amount of Cu of the external electrodes diffuse into the internal electrode layers during firing of the external electrodes (for example, see Japanese Patent Application Publication No. 2014-241453). An amount of Ni of the internal electrode layers diffusing into the external electrodes is smaller than the amount of Cu of the external electrodes diffusing into the internal electrode layers. A cavity occurs among the external electrodes, the internal electrode layers and the dielectric layers, because of expansion of the internal electrode layers. The cavity is relatively large with respect to the thicknesses of the external electrodes, when the thicknesses of the external electrodes are reduced. Therefore, resistance to humidity, resistance to voltage and reliability may be degraded.

The present invention has a purpose of providing a ceramic electronic device, circuit substrate and a manufacturing method of the ceramic electronic device that are capable of improving the resistance to humidity, the resistance to voltage and the reliability.

According to an aspect of the present invention, there is provided a ceramic electronic device including: a multilayer chip having a structure in which each of a plurality of dielectric layers and each of a plurality of internal electrode layers are alternately stacked, a main component of the dielectric layers being ceramic, the multilayer chip having a rectangular parallelepiped shape, respective one ends of the plurality of internal electrode layers being alternately exposed to a first end face and a second end face of the multilayer chip, the first end face being opposite to the second end face, a first external electrode provided on the first end face; and a second external electrode provided on the second end face, wherein a main component of the first external electrode and the second external electrode is a first metal, wherein maximum thicknesses of the first external electrode and the second external electrode is 20 μm or less, wherein the internal electrode layers include the first metal and a second metal of which a melting point is higher than that of the first metal, wherein a diffusion coefficient of the first metal with respect to the second metal is larger than a diffusion coefficient of the second metal with respect to the first metal, wherein a number of a cavity in a range of 10 numbers of the internal electrode layers that are next to each other and are connected to a same external electrode of the first external electrode and the second external electrode is 1 or less, wherein a length of the cavity in a stacking direction of the 10 numbers of the internal electrode layers is equal to or more than each interval of the 10 numbers of the internal electrode layers in a portion where the same external electrode is connected to the 10 numbers of the internal electrode layers.

According to another aspect of the present invention, there is provided a circuit substrate including the above-mentioned ceramic electronic device.

According to another aspect of the present invention, there is provided a manufacturing method of a ceramic electronic device including: forming a ceramic multilayer structure in which each of a plurality of dielectric green sheets and each of a plurality of metal conductive paste patterns including a first metal and a second metal for forming internal electrode layers are alternately stacked, respective one ends of the plurality of metal conductive paste patterns being alternately exposed to a first end face and a second end face of the ceramic multilayer structure, the ceramic multilayer structure having a rectangular parallelepiped shape; forming a multilayer chip by firing the ceramic multilayer structure; and forming a first external electrode on the first end face and forming a second external electrode on the second end face, a main component of the first external electrode and the second external electrode being the first metal, maximum thicknesses of the first external electrode and the second external electrode being 20 μm or more, wherein a melting point of the second metal is higher than a melting point of the first metal, wherein a diffusion coefficient of the first metal with respect to the second metal is larger than a diffusion coefficient of the second metal with respect to the first metal, wherein a molar ratio of the first metal with respect to a total amount of the first metal and the second metal in the metal conductive paste patterns is 10% or more and 90% or less.

DETAILED DESCRIPTION

A description will be given of an embodiment with reference to the accompanying drawings.

Embodiment

Figure 1:
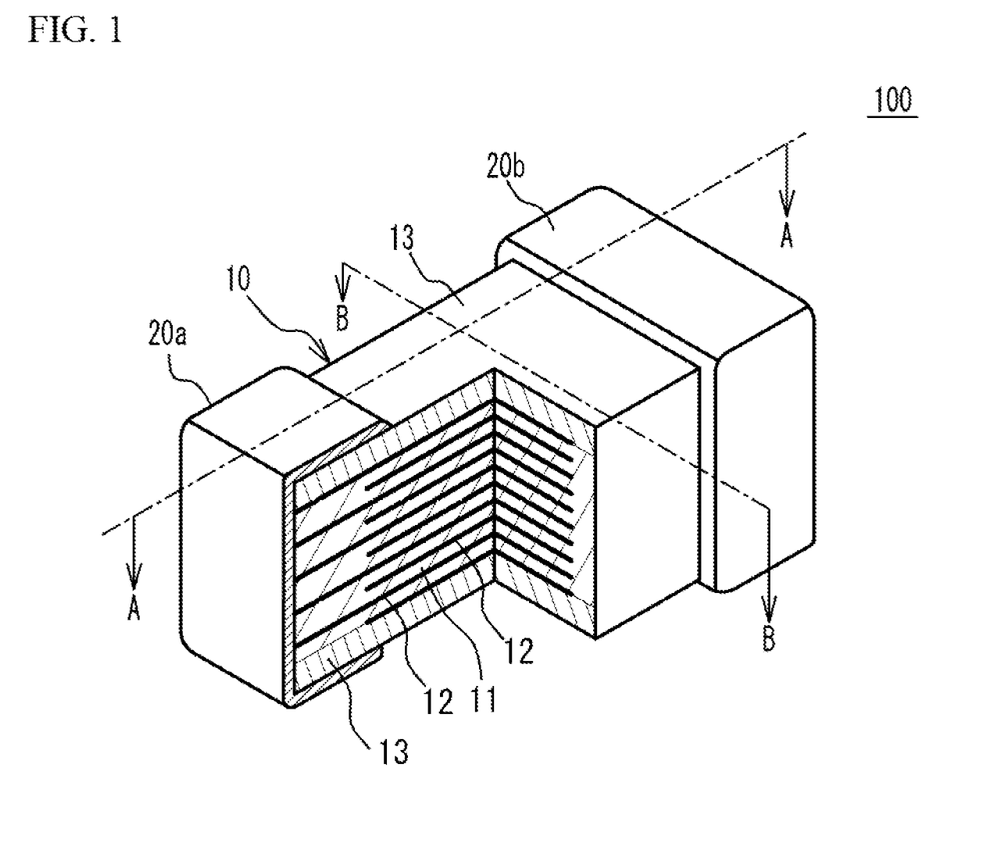
FIG. 1 illustrates a perspective view of a multilayer ceramic capacitor in which a cross section of a part of the multilayer ceramic capacitor is illustrated.
Figure 2:
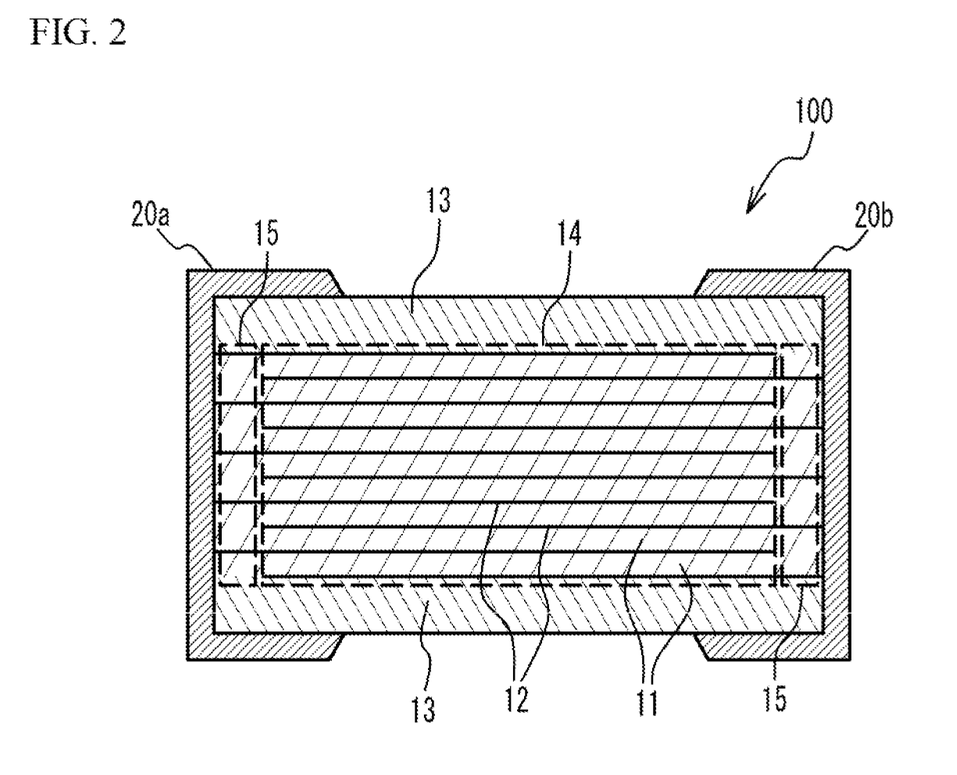
FIG. 2 illustrates a cross sectional view taken along a line A-A of FIG. 1.
Figure 3:
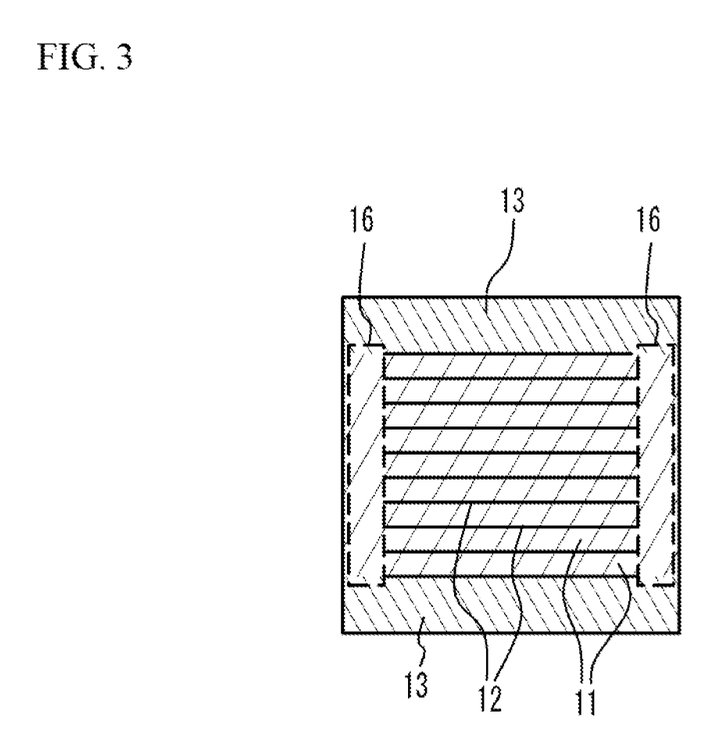
FIG. 3 illustrates a cross sectional view taken along a line B-B of FIG. 1.

A description will be given of an outline of a multilayer ceramic capacitor, as an example of a ceramic electronic device. FIG. 1 illustrates a perspective view of a multilayer ceramic capacitor 100 in accordance with an embodiment, in which a cross section of a part of the multilayer ceramic capacitor 100 is illustrated. FIG. 2 illustrates a cross sectional view taken along a line A-A of FIG. 1. FIG. 3 illustrates a cross sectional view taken along a line B-B of FIG. 1. As illustrated in FIG. 1 to FIG. 3, the multilayer ceramic capacitor 100 includes a multilayer chip 10 having a rectangular parallelepiped shape, and a pair of external electrodes 20a and 20b that are respectively provided at two end faces of the multilayer chip 10 facing each other. In four faces other than the two end faces of the multilayer chip 10, two faces other than an upper face and a lower face of the multilayer chip 10 in a stacking direction are referred to as side faces. The external electrodes 20a and 20b extend to the upper face, the lower face and the two side faces of the multilayer chip 10. However, the external electrodes 20a and 20b are spaced from each other.

The multilayer chip 10 has a structure designed to have dielectric layers 11 and internal electrode layers 12 alternately stacked. The dielectric layer 11 includes ceramic material acting as a dielectric material. End edges of the internal electrode layers 12 are alternately exposed to a first end face of the multilayer chip 10 and a second end face of the multilayer chip 10 that is different from the first end face. In the embodiment, the first end face faces with the second end face. The external electrode 20a is provided on the first end face. The external electrode 20b is provided on the second end face. Thus, the internal electrode layers 12 are alternately conducted to the external electrode 20a and the external electrode 20b. Thus, the multilayer ceramic capacitor 100 has a structure in which a plurality of dielectric layers 11 are stacked and each two of the dielectric layers 11 sandwich the internal electrode layer 12. In a multilayer structure of the dielectric layers 11 and the internal electrode layers 12, the internal electrode layer 12 is positioned at an outermost layer in a stacking direction. The upper face and the lower face of the multilayer structure that are the internal electrode layers 12 are covered by cover layers 13. A main component of the cover layer 13 is a ceramic material. For example, a main component of the cover layer 13 is the same as that of the dielectric layer 11.

For example, the multilayer ceramic capacitor 100 may have a length of 0.25 mm, a width of 0.125 mm and a height of 0.125 mm. The multilayer ceramic capacitor 100 may have a length of 0.4 mm, a width of 0.2 mm and a height of 0.2 mm. The multilayer ceramic capacitor 100 may have a length of 0.6 mm, a width of 0.3 mm and a height of 0.3 mm. The multilayer ceramic capacitor 100 may have a length of 1.0 mm, a width of 0.5 mm and a height of 0.5 mm. The multilayer ceramic capacitor 100 may have a length of 3.2 mm, a width of 1.6 mm and a height of 1.6 mm. The multilayer ceramic capacitor 100 may have a length of 4.5 mm, a width of 3.2 mm and a height of 2.5 mm. However, the size of the multilayer ceramic capacitor 100 is not limited.

A main component of the external electrodes 20a and 20b is a first metal. In the embodiment, as an example, Cu (copper) is used as the first metal. The internal electrode layer 12 include a second metal of which a melting point is higher than that of the first metal. In the embodiment, as an example, Ni (nickel) is used as the second metal. The dielectric layers 11 are mainly composed of a ceramic material that is expressed by a general formula $ABO_3$ and has a perovskite structure. The perovskite structure includes $ABO_{3-\alpha}$ having an off-stoichiometric composition. For example, the ceramic material is such as $BaTiO_3$ (barium titanate), $CaZrO_3$ (calcium zirconate), $CaTiO_3$ (calcium titanate), $SrTiO_3$ (strontium titanate), $Ba_{1-x-y}Ca_xSr_yT_{11-z}Zr_zO_3$ ($0 \leq x \leq 1$, $0 \leq y \leq 1$, $0 \leq z \leq 1$) having a perovskite structure.

As illustrated in FIG. 2, a section, in which a set of the internal electrode layers 12 connected to the external electrode 20a face another set of the internal electrode layers 12 connected to the external electrode 20b, is a section generating electrical capacity in the multilayer ceramic capacitor 100. And so, the section is referred to as a capacity section 14. That is, the capacity section 14 is a section in which the internal electrode layers 12 next to each other being connected to different external electrodes face each other.

A section, in which the internal electrode layers 12 connected to the external electrode 20a face with each other without sandwiching the internal electrode layer 12 connected to the external electrode 20b, is referred to as an end margin section 15. A section, in which the internal electrode layers 12 connected to the external electrode 20b face with each other without sandwiching the internal electrode layer 12 connected to the external electrode 20a is another end margin section 15. That is, the end margin section 15 is a section in which a set of the internal electrode layers 12 connected to one external electrode face with each other without sandwiching the internal electrode layer 12 connected to the other external electrode. The end margin section 15 is a section that does not generate electrical capacity in the multilayer ceramic capacitor 100.

As illustrated in FIG. 3, a section of the multilayer chip 10 from the two sides thereof to the internal electrode layers 12 is referred to as a side margin section 16. That is, the side margin section 16 is a section covering edges of the stacked internal electrode layers 12 in the extension direction toward the two side faces.

Figure 4A:
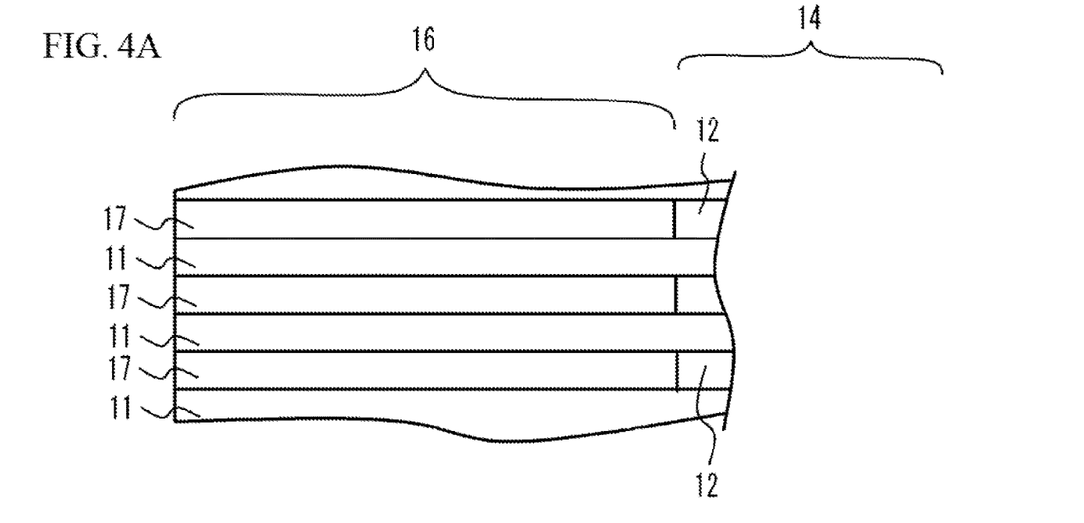
FIG. 4A illustrates an enlarged view of a cross section of a side margin section.

FIG. 4A illustrates an enlarged view of the cross section of the side margin section 16. The side margin section 16 has a structure in which the dielectric layer 11 and a reverse pattern layer 17 are alternately stacked in a stacking direction of the dielectric layer 11 and the internal electrode layer 12 in the capacity section 14. Each of the dielectric layers 11 of the capacity section 14 are continuously formed with each of the dielectric layers 11 of the side margin section 16. With the structure, a level difference between the capacity section 14 and the side margin section 16 is suppressed.

Figure 4B:
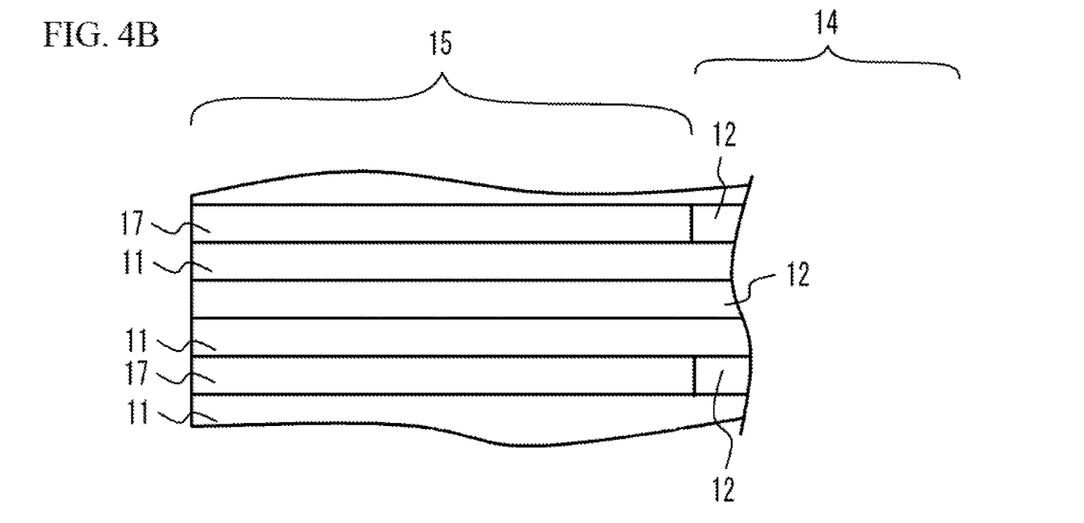
FIG. 4B illustrates an enlarged view of a cross section of an end margin section.

FIG. 4B illustrates an enlarged view of the cross section of the end margin section 15. Compared to the side margin section 16, in the end margin section 15, every other layer, the internal electrode layers 12 extends to the edge face of the end margin section 15. The reverse pattern layer 17 is not provided in a layer where the internal electrode layer 12 extends to the end face of the end margin section 15. Each of the dielectric layers 11 of the capacity section 14 is continuously formed with each of the dielectric layers 11 of the end margin section 15. With the structure, a level difference between the capacity section 14 and the end margin section 15 is suppressed.

Generally, a sintering temperature of metal powder tends to be lower than a sintering temperature of ceramic powder. And so, in the embodiment, the internal electrode layers 12 include the second metal of which a melting point is higher than a melting point of the first metal which is a main component of the external electrodes 20a and 20b. In this case, it is possible to reduce a difference between an optimal sintering temperature of the dielectric layers 11 during a firing of the multilayer chip 10 and an optimal sintering temperature of the internal electrode layer 12 during the firing. It is therefore possible to form the dielectric layers 11 together with the internal electrode layers 12 by a firing process, while excessive sintering of the internal electrode layers 12 is suppressed.

However, it is difficult to form the external electrodes 20a and 20b together with the dielectric layers 11 by a firing process, because the melting point of the first metal is low. And so, for example, it is possible to form the external electrodes 20a and 20b by coating exposed portions of the internal electrode layers 12 (the two end faces of the multilayer chip 10) with paste of the first metal and firing the paste, after forming the multilayer chip 10.

A description will be given of a multilayer ceramic capacitor having Ni internal electrodes and Cu external electrodes. In the multilayer ceramic capacitor having the Ni internal electrode layers and the Cu external electrodes, a large amount of Cu of the external electrodes diffuses to the internal electrodes during a firing process. A diffusion coefficient of Ni with respect to Cu is larger than a diffusion coefficient of Cu with respect to Ni. Therefore, a diffusion amount of Ni from the internal electrodes to the external electrodes is larger than a diffusion amount of Cu from the external electrodes to the internal electrodes. Therefore, the internal electrodes expand. And, a cavity occurs among the external electrodes, the internal electrodes and the dielectric layers. When the thicknesses of the external electrodes are reduced, the cavity is relatively large with respect to the thicknesses of the external electrodes. Therefore, the resistance to humidity, the resistance to voltage and the reliability may be degraded.

Figure 5:
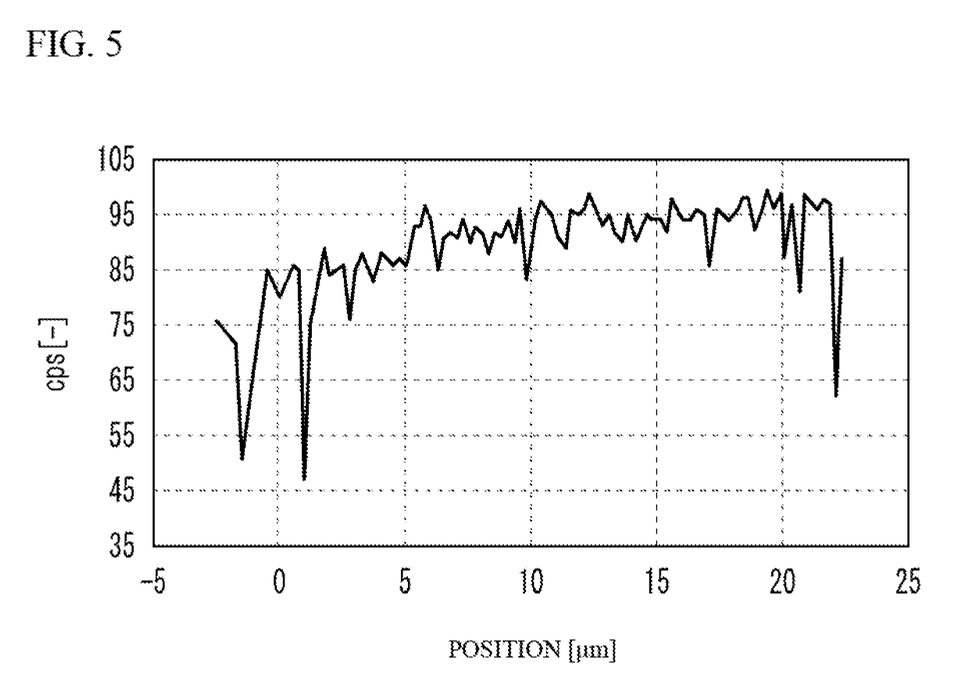
FIG. 5 illustrates an EDS line analysis result showing a detected amount of Cu in internal electrode layers in a case where Ni is used for the internal electrode layers and Cu external electrodes are formed on two end faces of a multilayer chip by a firing process after the multilayer chip is fired.

FIG. 5 illustrates an EDS line analysis result showing a detected amount of Cu in the internal electrode layers in a case where Ni is used for the internal electrode layers and Cu external electrodes are formed on the two end faces of the multilayer chip by a firing process after the multilayer chip is fired. In FIG. 5, a horizontal axis indicates a position from the end face of the multilayer chip in an extension direction of the internal electrode layers. "0" indicates a connection point between the internal electrodes and the external electrode. A minus side indicates the side of the internal electrode layers. A plus side indicates the side of the external electrode. A vertical axis indicates a detected number of an X-ray per one second. Cu is not added to the internal electrode layers during a firing process of the internal electrode layers. As illustrated in FIG. 5, a lot of Cu is detected around the end face of the multilayer chip, even if Cu is not added to the internal electrodes during the firing process.

Figure 6:
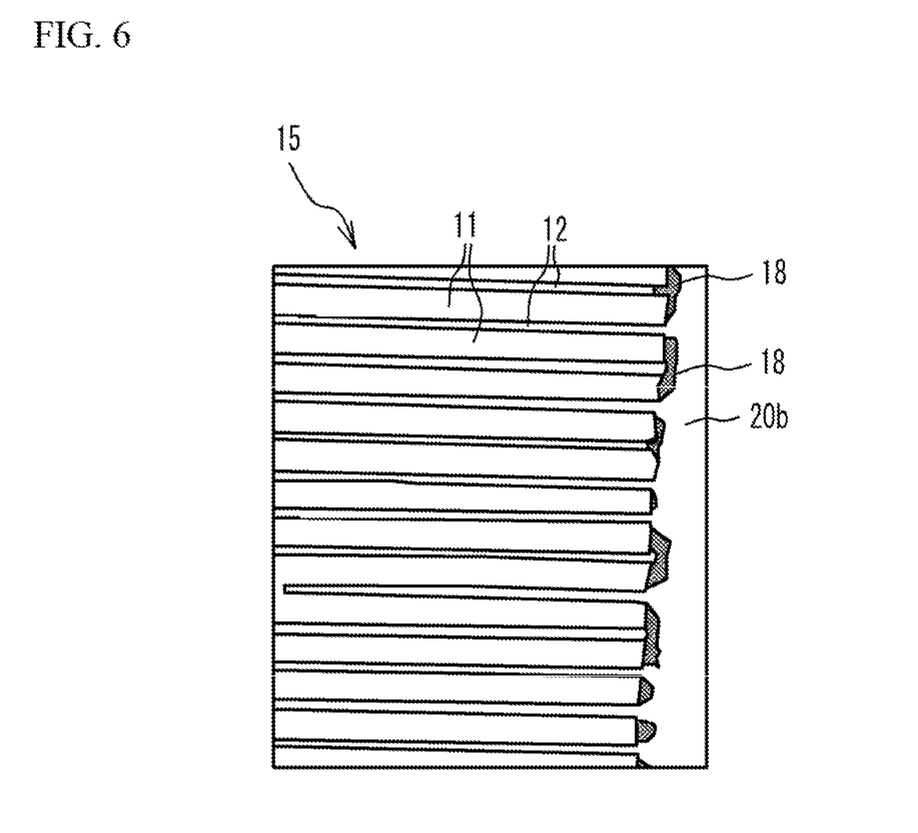
FIG. 6 illustrates a cavity formed among dielectric layers, internal electrode layers and an external electrode.

In this case, a cavity is formed among the external electrode, the internal electrode layers and the dielectric layers, in one of the end margin sections 15. For example, as illustrated in FIG. 6, a cavity 18 is formed in a connection portion between the internal electrode layers 12 and the external electrode 20b in the end margin 15. A length of the cavity 18 in the stacking direction is equal to or more than an interval of two of the internal electrode layers 12 next to each other. In the capacity section, the two of the internal electrode layers 12 are two internal electrode layers 12 sandwiching one internal electrode layer 12 connected to the external electrode 20a. In the other of the end margin sections 15, another cavity 18 is formed at a connection portion among the external electrode, the internal electrode layers and the dielectric layers. A length of the cavity 18 in the stacking direction is equal to or more than an interval of two of the internal electrode layers 12 next to each other. When the thicknesses of the external electrodes are reduced and the cavities are relatively large with respect to the thickness of the external electrodes, the resistance to humidity, the resistance to voltage and the reliability of the multilayer ceramic capacitor may be degraded. In FIG. 6, a hatch of the dielectric layers 11, the internal electrode layers 12 and the external electrode 20b is omitted. A mesh pattern is added to the cavity 18.

Recently, it is requested to improve the capacity volume density of the multilayer ceramic capacitor 100. And so, it is requested that the thicknesses of the external electrodes 20a and 20b are reduced. In the embodiment, a maximum thickness of the external electrodes 20a and 20b is 20 µm or less. In this case, it is preferable that the number of the cavities is small among the external electrodes 20a and 20b, the internal electrode layers 12 and the dielectric layers 11.

Figure 7:
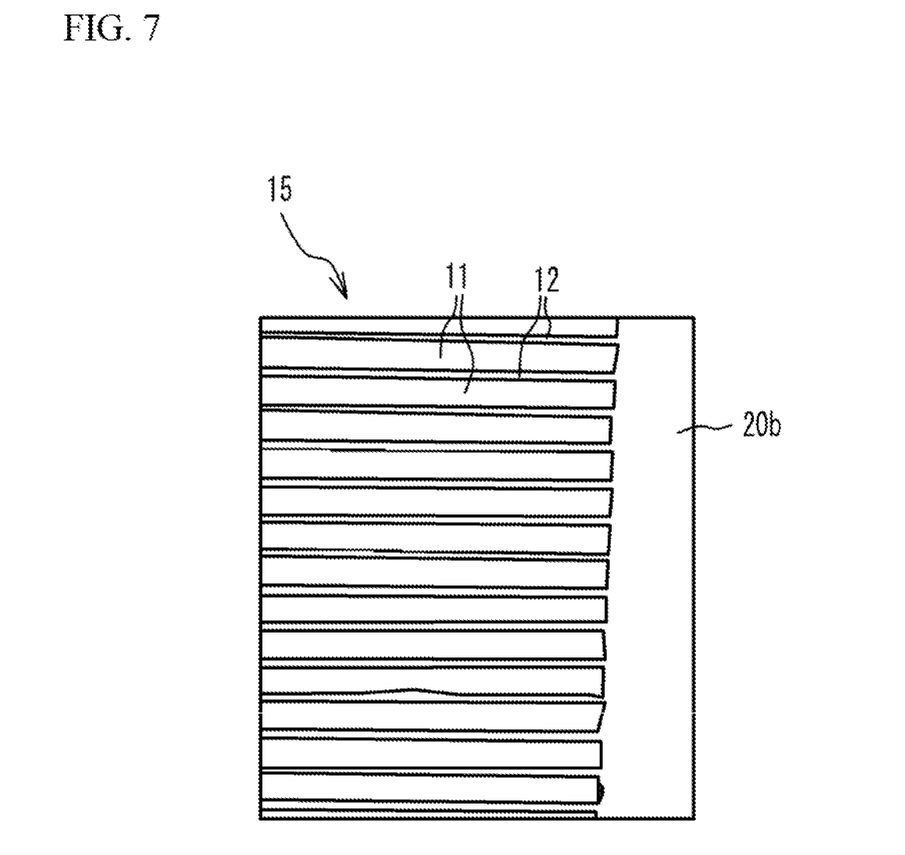
FIG. 7 illustrates a cross section area among dielectric layers, internal electrode layers and an external electrode.

And so, the internal electrode layers 12 include the first metal in addition to the second metal. In this case, the concentration difference of the first metal between the external electrodes 20a and 20b and the internal electrode layers 12 is reduced. Therefore, even if the diffusion coefficient of the first metal with respect to the second metal is larger than that of the second metal with respect to the first metal, it is possible to reduce the amount of the first metal diffusing to the internal electrode layers 12 from the external electrodes 20a and 20b. As illustrated in FIG. 7, the number of a cavity in a range of 10 numbers of the internal electrode layers 12 that are next to each other and are connected to the same external electrode is 1 or less. A length of the cavity is defined as a length in a stacking direction which is equal to or more than each interval of the 10 numbers of the internal electrode layers 12 in a portion where the same external electrode is connected to the 10 numbers of the internal electrode layers 12. In the structure, the cavity is relatively small with respect to the thicknesses of the external electrodes 20a and 20b. Therefore, the resistance to humidity, the resistance to voltage and the reliability of the multilayer ceramic capacitor 100 are improved. In the example of FIG. 7, a cavity of which the length is less than each interval of the 10 numbers of the internal electrode layers 12 is formed. However, a cavity of which the length is equal to or more than each interval of the 10 numbers of the internal electrode layers 12 is not formed.

When the thicknesses of the external electrodes 20a and 20b are small, the effect of suppression of the occurrence of the cavity is remarkable. For example, when maximum thicknesses of the external electrodes 20a and 20b are 18 μm or less, the effect of suppression of the occurrence of the cavity is remarkable. When the maximum thicknesses of the external electrodes 20a and 20b are 15 μm or less, the effect of suppression of the occurrence of the cavity is more remarkable.

In the embodiment, Cu is used as an example of the first metal, and Ni is used as an example of the second metal. However, the structure it not limited. It is possible to adopt a combinations of metals as the first metal and the second metal, when a melting point of the metal used as the first metal is higher than that of the metal used as the second metal, and a diffusion coefficient of the metal used as the first metal with respect to the metal used as the second metal is larger than a diffusion coefficient of the metal used as the second metal with respect to the metal used as the first metal.

When a molar ratio of the first metal in the internal electrode layers 12 is low, the concentration difference of the first metal between the internal electrode layers 12 and the external electrodes 20a and 20b may not be necessarily sufficiently reduced. And so, it is preferable that the molar ratio of the first metal in the internal electrode layers 12 has a lower limit. For example, it is preferable that the molar ratio of the first metal in the internal electrode layers 12 is 10% or more. It is more preferable that the molar ratio is 15% or more. On the other hand, a melting point of whole of the internal electrode layers 12 is reduced, the internal electrode layers 12 are excessively sintered during the firing process, and a continuity modulus of the internal electrode layers 12 may be degraded, when the molar ratio of the first metal in the internal electrode layers 12 is high. And so, it is preferable that the molar ratio of the first metal in the internal electrode layers 12 has an upper limit. For example, it is preferable that the molar ratio of the first metal in the internal electrode layers 12 is 90% or less. It is more preferable that the molar ratio is 66% or less. It is still more preferable that the molar ratio is 33% or less. In particular, when the molar ratio of the first metal in the internal electrode layers 12 is 15% or more, formation of a micro cavity during the firing process is suppressed. When the molar ratio of the first metal in the internal electrode layers 12 is 33% or less, moving of the internal electrode layers 12 during the firing process is suppressed and variation of intervals of the dielectric layers 11 is suppressed. Therefore, resistance to voltage is improved.

Figure 8:
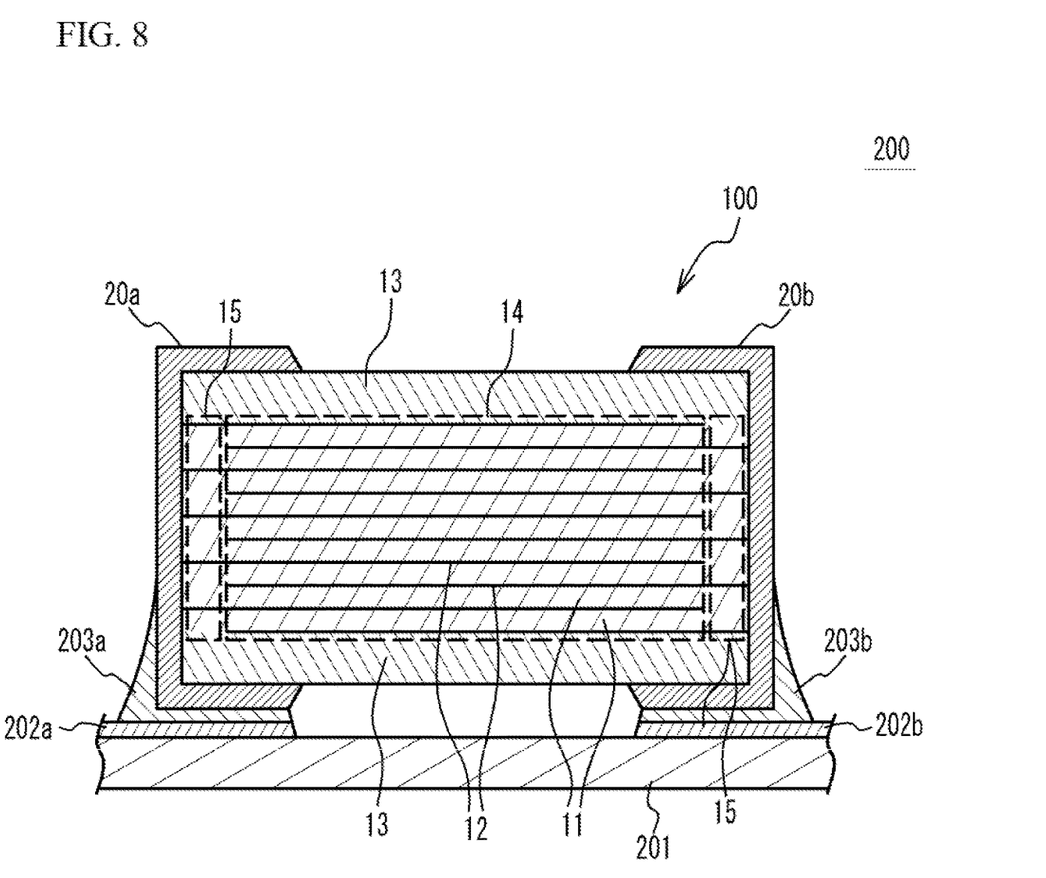
FIG. 8 illustrates a circuit substrate in accordance with an embodiment.

FIG. 8 illustrates a circuit substrate 200 in accordance with an embodiment. As illustrated in FIG. 8, the circuit substrate 200 has a structure in which the multilayer ceramic capacitor 100 is mounted on a substrate 201. A wiring pattern 202a, a wiring pattern 202b and so on are mounted on a mounting face of the substrate 201. The external electrode 20a is connected to the wiring pattern 202a via a solder 203a. Thus, the external electrode 20a is electrically connected to the wiring pattern 202a. The external electrode 20b is connected to the wiring pattern 202b via a solder 203b. Thus, the external electrode 20b is electrically connected to the wiring pattern 202b. In this manner, the multilayer ceramic capacitor 100 may be mounted on the substrate 201.

The circuit substrate 200 on which the multilayer ceramic capacitor 100 is mounted has favorable resistance to humidity, favorable reliability and favorable resistance to voltage, and achieves favorable electrostatic capacity ratio and favorable tan δ ratio.

Figure 9:
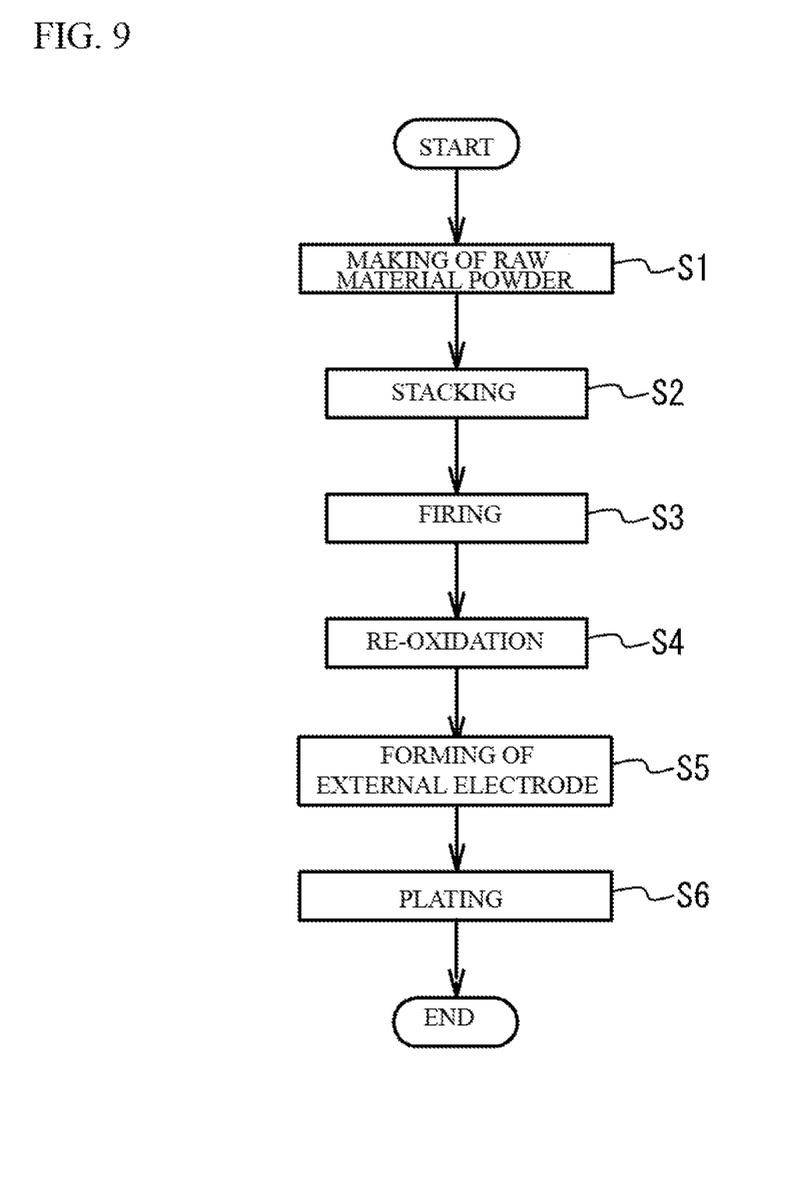
FIG. 9 illustrates a manufacturing method of a multilayer ceramic capacitor.

Next, a description will be given of a manufacturing method of the multilayer ceramic capacitor 100. FIG. 9 illustrates a manufacturing method of the multilayer ceramic capacitor 100.

(Making process of raw material powder) A dielectric material for forming the dielectric layers 11 is prepared as illustrated in FIG. 9. Generally, an A site element and a B site element are included in the dielectric layers 11 in a sintered phase of grains of $ABO_3$. For example, $BaTiO_3$ is tetragonal compound having a perovskite structure and has a high dielectric constant. Generally, $BaTiO_3$ is obtained by reacting a titanium material such as titanium dioxide with a barium material such as barium carbonate and synthesizing barium titanate. Various methods can be used as a synthesizing method of the ceramic structuring the dielectric layers 11. For example, a solid-phase method, a sol-gel method, a hydrothermal method or the like can be used. The embodiment may use any of these methods.

An additive compound may be added to resulting ceramic powders, in accordance with purposes. The additive compound may be an oxide of Mg (magnesium), Mn (manganese), V (vanadium), Cr (chromium) or a rare earth element (Y (yttrium), Sm (samarium), Eu (europium), Gd (gadolinium), Tb (terbium), Dy (dysprosium), Ho (holmium), Er (erbium), Tm (thulium) and Yb (ytterbium)), or an oxide of Co (cobalt), Ni, Li (lithium), B (boron), Na (sodium), K (potassium) and Si (silicon), or glass.

In the embodiment, it is preferable that ceramic particles structuring the dielectric layers 11 are mixed with compound including additives and are calcined in a temperature range from 820 degrees C. to 1150 degrees C. Next, the resulting ceramic particles are wet-blended with additives, are dried and crushed. Thus, ceramic powder is obtained. For example, it is preferable that an average grain diameter of the resulting ceramic powder is 50 nm to 300 nm from a viewpoint of thickness reduction of the dielectric layers 11. The grain diameter may be adjusted by crushing the resulting ceramic powder as needed. Alternatively, the grain diameter of the resulting ceramic power may be adjusted by combining the crushing and classifying.

Next, a reverse pattern material for forming the end margin sections 15 and the side margin sections 16 is prepared. An additive compound may be added to ceramic powder of barium titanate obtained by the same process as the dielectric material, in accordance with purposes. The additive compound may be an oxide of Mg, Mn, V, Cr or a rare earth element (Y, Sm, Eu, Gd, Tb, Dy, Ho, Er, Tm and Yb), or an oxide of Co, Ni, Li, B, Na, K and Si, or glass.

In the embodiment, it is preferable that ceramic particles structuring the end margin sections 15 and the side margin sections 16 are mixed with compound including additives and are calcined in a temperature range from 820 degrees C. to 1150 degrees C. Next, the resulting ceramic particles are wet-blended with additives, are dried and crushed. Thus, ceramic powder is obtained. For example, the grain diameter of the resulting ceramic powder may be adjusted by crushing the resulting ceramic powder as needed. Alternatively, the grain diameter of the resulting ceramic power may be adjusted by combining the crushing and classifying.

(Stacking process) Next, a binder such as polyvinyl butyral (PVB) resin, an organic solvent such as ethanol or toluene, and a plasticizer are added to the resulting dielectric material and wet-blended. With use of the resulting slurry, a base material is coated with a strip-shaped dielectric green sheet with a thickness of 0.8 μm or less by, for example, a die coater method or a doctor blade method, and then dried.

Next, metal conductive paste for forming an internal electrode is provided on the surface of the dielectric green sheet by screen printing or gravure printing. The metal conductive paste includes an organic binder. Thus, a first pattern for forming an internal electrode layer is provided. As co-materials, ceramic particles are added to the metal conductive paste. A main component of the ceramic particles is not limited. However, it is preferable that the main component of the ceramic particles is the same as that of the dielectric layer 11. In the embodiment, mixture of the first metal and the second metal is used as the metal powder for the metal conductive paste for forming the internal electrode layer.

Next, a binder and an organic solvent are added to the reverse pattern material. The binder is such as ethyl cellulose. The organic solvent is such as terpineol. And the reverse pattern material is kneaded with the binder and the organic solvent. Thus, reverse pattern paste for forming the reverse pattern layer is obtained. The reverse pattern paste is printed on a circumference area of the dielectric green sheet. The circumference area is a part of the dielectric green sheet where the first pattern is not printed. Thus, a second pattern is provided. Therefore, a level difference caused by the first pattern is buried. The dielectric green sheet, the first pattern and the second pattern act as a stack unit.

Then, each of a plurality of stack units are alternately stacked while the base material is peeled so that the internal electrode layers 12 and the dielectric layers 11 are alternated with each other and the end edges of the internal electrode layers 12 are alternately exposed to both end faces in the length direction of the dielectric layer 11 so as to be alternately led out to a pair of external electrodes 20a and 20b of different polarizations. For example a total number of the staked stack units is 100 to 500. After that, a cover sheet to be the cover layer 13 is cramped on the multilayer structure of the dielectric green sheets. And another cover sheet to be the cover layer 13 is cramped under the multilayer structure. Thus, a ceramic multilayer structure is obtained.

(Firing process) The resulting ceramic multilayer structure is fired for ten minutes to 2 hours in a reductive atmosphere having an oxygen partial pressure of $10^{-5}$ to $10^{-8}$ atm in a temperature range of 1100 degrees C. to 1300 degrees C. Thus, each compound of the dielectric green sheet is sintered and grown into grains. In this manner, it is possible to manufacture the multilayer chip 10.

(Re-oxidizing process) After that, a re-oxidizing process may be performed in $N_2$ gas atmosphere in a temperature range of 600 degrees C. to 1000 degrees C.

(Forming process of external electrode) Next, the external electrodes 20a and 20b are formed on the multilayer chip 10. In concrete, both edge faces of the multilayer chip 10 are coated with metal conductive paste including a metal filler, a glass frit, a binder and a solvent. And the metal conductive paste is dried. A main component of the metal filler is the first metal. After that, the metal conductive paste is fired. Thus, the external electrodes 20a and 20b are formed. The binder and the solvent vaporize by the firing. It is preferable that the firing is performed for 3 minutes to 30 minutes in a temperature range of 700 degrees C. to 900 degrees C. It is more preferable that the baking is performed for 5 minutes to 15 minutes in a temperature range of 760 degrees C. to 840 degrees C. In the embodiment, the maximum thicknesses of the external electrodes 20a and 20b after the firing may 20 μm or less. The minimum thicknesses of the external electrodes 20a and 20b may be 1.0 μm or more.

(Plating process) After that, with a plating process, a metal such as Cu, Ni, and Sn may be coated on the external electrodes 20a and 20b.

In the embodiment, the metal conductive paste for the internal electrode layers includes the first metal. In this case, the concentration difference of the first metal between the metal conductive paste for the internal electrode layers and the metal conductive paste for the external electrodes is reduced. Thus, an amount of the first metal diffusing from the metal conductive paste for the external electrodes to the internal electrode layers 12 is suppressed. Therefore, expansion of the internal electrode layers 12 is suppressed. And, formation of a cavity among the external electrodes 20a and 20b, the internal electrode layers 12 and the dielectric layers 11.

When the amount of the first metal in the metal conductive paste for the internal electrode layers is small, the concentration difference of the first metal between the metal conductive paste for the internal electrode layers and the metal conductive paste for the external electrodes may not be necessarily sufficiently reduced. In this case, it may be difficult to sufficiently suppress the amount of the first metal diffusing from the metal conductive paste for the external electrodes to the internal electrode layers 12. And so, the amount of the first metal in the metal conductive paste for the internal electrode layers has a lower limit. In concrete, the molar ratio of the first metal with respect to a total amount of the first metal and the second metal in the metal conductive paste for the internal electrode layers is 10% or more. It is therefore possible to improve the resistance to humidity, the resistance to voltage and the reliability of the multilayer ceramic capacitor 100.

From a viewpoint of suppression of the diffusion quantity of the first metal into the internal electrode layers 12, it is preferable that the molar ratio of the first metal is 15% or more in the metal conductive paste for the internal electrode layers.

The melting point of the whole of the metal conductive paste for the internal electrode layers is reduced, the internal electrode layers 12 are excessively sintered, and the continuity modulus of the internal electrode layers 12 may be degraded, when the amount of the first metal in the metal conductive paste for the internal electrode layers is large. When the continuity modulus of the internal electrode layers 12 is reduced, an electrostatic capacity of the multilayer ceramic capacitor 100 may be reduced. And so, the amount of the first metal in the metal conductive paste for the internal electrode layers has an upper limit. In concrete, in the metal conductive paste for the internal electrode layers, the molar ratio of the first metal with respect to the total amount of the first metal and the second metal is 90% or less. From a viewpoint of improvement of the continuity of the internal electrode layers 12, it is preferable that the molar ratio of the first metal in the metal conductive paste for the internal electrode layers is 80% or less. It is more preferable that the molar ratio of the first metal is 66% or less. It is still more preferable that the molar ratio of the first metal is 33% or less.

When the thicknesses of the external electrodes 20a and 20b are small, the effect of suppression of the occurrence of the cavity is remarkable. For example, when maximum thicknesses of the external electrodes 20a and 20b are 18 μm or less, the effect of suppression of the occurrence of the cavity is remarkable. When the maximum thicknesses of the external electrodes 20a and 20b are 15 μm or less, the effect of suppression of the occurrence of the cavity is more remarkable.

In the embodiments, the multilayer ceramic capacitor is described as an example of ceramic electronic devices. However, the embodiments are not limited to the multilayer ceramic capacitor. For example, the embodiments may be applied to another electronic device such as varistor or thermistor.

EXAMPLES

The multilayer ceramic capacitors in accordance with the embodiment were made and the property was measured.

Examples 1 to 13 and Comparative Examples 1 and 2

Ceramic powder of $BaTiO_3$ was prepared. Necessary additive compound and necessary sintering assistant were added to the ceramic powder. And, the ceramic powder in which the additive compound and the sintering assistant were added was sufficiently wet-blended and crushed. Thus, the dielectric material was obtained. The reverse pattern material was prepared by the same method as the dielectric material. An organic binder and a solvent were added to the dielectric material. And dielectric green sheets were made by a doctor blade method. The dielectric green sheets had a thickness of 0.8 The organic binder was polyvinyl butyral (PVB) resin or the like. The solvent was ethanol, toluene or the like. And a plasticizer and so on were added.

Next, the metal conductive paste for forming the internal electrode layers was made by mixing metal powder, a co-material (barium titanate), a binder (ethyl cellulose), a solvent and necessary assistant agent. In a comparative example 1, the molar ratio of Cu in the metal powder was 0%. The molar ratio of Ni in the metal powder was 100%. In a comparative example 2, the molar ratio of Cu in the metal powder was 5%. The molar ratio of Ni in the metal powder was 95%. In an example 1, the molar ratio of Cu in the metal powder was 10%. The molar ratio of Ni in the metal powder was 90%. In an example 2, the molar ratio of Cu in the metal powder was 12%. The molar ratio of Ni in the metal powder was 88%. In an example 3, the molar ratio of Cu in the metal powder was 15%. The molar ratio of Ni in the metal powder was 85%. In an example 4, the molar ratio of Cu in the metal powder was 20%. The molar ratio of Ni in the metal powder was 80%. In an example 5, the molar ratio of Cu in the metal powder was 25%. The molar ratio of Ni in the metal powder was 75%. In an example 6, the molar ratio of Cu in the metal powder was 28%. The molar ratio of Ni in the metal powder was 72%. In an example 7, the molar ratio of Cu in the metal powder was 33%. The molar ratio of Ni in the metal powder was 67%. In an example 8, the molar ratio of Cu in the metal powder was 40%. The molar ratio of Ni in the metal powder was 60%. In an example 9, the molar ratio of Cu in the metal powder was 50%. The molar ratio of Ni in the metal powder was 50%. In an example 10, the molar ratio of Cu in the metal powder was 66%. The molar ratio of Ni in the metal powder was 34%. In an example 11, the molar ratio of Cu in the metal powder was 70%. The molar ratio of Ni in the metal powder was 30%. In an example 12, the molar ratio of Cu in the metal powder was 80%. The molar ratio of Ni in the metal powder was 20%. In an example 13, the molar ratio of Cu in the metal powder was 90%. The molar ratio of Ni in the metal powder was 10%.

The first pattern is printed by screen-printing the conductive paste for forming the internal electrode layer on the dielectric green sheet. Next, a binder such as ethyl cellulose and an organic solvent such as terpineol were added to the reverse material. And the reverse pattern material was kneaded with the binder and the organic solvent. Thus, the reverse pattern paste for forming the reverse pattern layers was obtained. The reverse pattern paste was printed on a circumference area of the dielectric green sheet. The circumference area was a part of the dielectric green sheet where the first pattern was not printed. Thus, the second pattern is provided. 250 numbers of the dielectric green sheets on which the first pattern and the second pattern were printed were stacked. A cover sheet was stacked on the stacked dielectric green sheets. Another cover sheet was stacked under the stacked dielectric green sheets. After that, the ceramic multilayer structure was obtained by a thermal compressing. And the ceramic multilayer structure was cut into a predetermined size. After that, the resulting ceramic multilayer structure was fired for 10 minutes to 2 hours in a reductive atmosphere a temperature range of 1100 degrees C. to 1300 degrees C. And, the multilayer chip 10 was formed. The resulting multilayer chip 10 had a length of 1.0 mm and a width of 0.5 mm. Next, the multilayer chip 10 was subjected to the re-oxidation process in $N_2$ atmosphere at 800 degrees C.

After that, the both of the edge faces of the multilayer chip 10 were coated with the metal conductive paste for forming the external electrodes including the Cu filler, the glass frit, the binder and the solvent. And the metal conductive paste was dried. Thus, the external electrodes 20a and 20b were formed. The maximum thickness of the external electrodes 20a and 20b was 18 μm.

(Analysis) Existence of cavities, resistance to humidity, reliability, resistance to voltage, electrostatic capacity ratio, and tan δ ratio were measured, with respect to the multilayer ceramic capacitors of the examples 1 to 13 and the comparative examples 1 and 2. Table 1 shows the results. It is possible to confirm the molar ratio of Cu in the internal electrode layers with use of EPMA, by quantitatively analyzing a predetermined area of a surface of internal electrode layers in a region of a cross section as illustrated in FIG. 2 on which diffusion of a component of the external electrodes hardly influences. For example, the region is a center region of five regions which equally divides the region between the external electrodes. In the analysis, the region of the internal electrode layers which is an object to be analyzed may have a size of 0.3 μm×0.5 μm. In order suppress variation, three different points of the internal electrode layer may be analyzed, and an average value of the analyzed values may be used as a measured value. It was confirmed that the results of the quantitative analysis were the same as the molar ratios of Cu in the metal powder used as the raw material of the internal electrode layer.

TABLE 1

| | MOLAR RATIO OF Cu (%) | CAVITY | RESISTANCE TO HUMIDITY | RELIABILITY | RESISTANCE TO VOLTAGE | ELECTRO-STATIC CAPACITY RATIO (%) | tanδ RATIO (%) |
|---|---|---|---|---|---|---|---|
| COMPARATIVE EXAMPLE 1 | 0 | EXIST | X | X | X (31 V) | 100 | 100 |
| COMPARATIVE EXAMPLE 2 | 5 | EXIST | X | X | X (39 V) | 98 | 98 |
| EXAMPLE 1 | 10 | NONE | ○ | ○ | ○ (54 V) | 98 | 99 |
| EXAMPLE 2 | 12 | NONE | ○ | ○ | ○ (63 V) | 99 | 100 |
| EXAMPLE 3 | 15 | NONE | ○ | ○ | ⊙ (71 V) | 96 | 99 |
| EXAMPLE 4 | 20 | NONE | ○ | ○ | ⊙ (73 V) | 97 | 101 |
| EXAMPLE 5 | 25 | NONE | ○ | ○ | ⊙ (81 V) | 96 | 101 |
| EXAMPLE 6 | 28 | NONE | ○ | ○ | ⊙ (83 V) | 97 | 101 |
| EXAMPLE 7 | 33 | NONE | ○ | ○ | ⊙ (81 V) | 95 | 100 |
| EXAMPLE 8 | 40 | NONE | ○ | ○ | ○ (64 V) | 98 | 102 |
| EXAMPLE 9 | 50 | NONE | ○ | ○ | ○ (58 V) | 97 | 102 |
| EXAMPLE 10 | 66 | NONE | ○ | ○ | ○ (54 V) | 94 | 99 |
| EXAMPLE 11 | 70 | NONE | ○ | ○ | ○ (53 V) | 96 | 97 |
| EXAMPLE 12 | 80 | NONE | ○ | ○ | ○ (51 V) | 94 | 97 |
| EXAMPLE 13 | 90 | NONE | ○ | ○ | ○ (52 V) | 68 | 99 |

It was determined whether cavities existed or not, by observing a center portion of the connected portion of the internal electrode layers and the external electrode in a center portion of the cross section taken along the line A-A of FIG. 1 by using an SEM (Scanning Electron Microscope) with 2000 magnifications. When the number of a cavity in a range of 10 numbers of the internal electrode layers 12 that were next to each other and were connected to the same external electrode is 1 or less in the observed area, it was determined that the cavity was not formed. When the number of the cavity was 2 or more, it was determined that the cavity was formed. The length of the cavity is defined as the length which is equal to or more than each interval of the 10 numbers of the internal electrode layers 12 in a portion where the same external electrode is connected to the 10 numbers of the internal electrode layers 12.

With respect to the resistance to humidity, the multilayer ceramic capacitors of the examples 1 to 13 and the comparative examples 1 and 2 were left at 40 degrees C. and a relative humidity of 90% for 500 hours. After that, the multilayer ceramic capacitors were left at a room temperature for 24 hours. After that, insulating resistances of the multilayer ceramic capacitors were measured. Multilayer ceramic capacitors of which the insulating resistance was 10 MΩ or more were determined as good "○". Multilayer ceramic capacitors of which the insulating resistance was less than 10 MΩ were determined as bad "x".

With respect to the reliability, the multilayer ceramic capacitors were subjected to a HALT (Highly Accelerated Limit Test) of 125 degrees C. and 12 V. Multilayer ceramic capacitors of which a current did not exceed 1 A were determined as good "○". Multilayer ceramic capacitors of which the current exceeded 1 A were determined as bad "x".

With respect to the resistance to voltage, voltages of 25 samples of each of the examples 1 to 13 and the comparative examples 1 and 2 in which a leak current exceeded 1 A at a room temperature of 25 degrees C. were measured. When an average value of the 25 samples was 70 V or more, the 25 samples were determined as very good. When the average value was 50 V to 69V, the 25 samples were determined as good. When the average value was less than 50V, the 25 samples were determined as bad.

The electrostatic capacity ratios (%) of the multilayer ceramic capacitors were measured at a measured voltage of 0.5 V and a measured frequency of 1 kHz with use of an LCR meter. The ratios were evaluated with respect to the ratio of the comparative example 1.

The tan δ ratios (%) of the multilayer ceramic capacitors were measured at a measured voltage of 0.5 V and a measured frequency of 1 kHz with use of an LCR meter. The ratios were evaluated with respect to the ratio of the comparative example 1.

As shown in Table 1, it was determined that a cavity existed in the comparative example 1. It is thought that this was because Cu was not added to the metal conductive paste for forming the internal electrode layers, and a large amount of Cu in the metal conductive paste for forming the external electrodes diffused into the internal electrode layers 12. It was determined that a cavity existed in the comparative example 2. It is thought that this was because the molar ratio of added Cu was less than 10% although Cu was added to the metal conductive paste for forming the internal electrode layers. The resistance to humidity and the reliability were determined as bad, in the comparative examples 1 and 2. It is thought that this was because a cavity was formed.

On the other hand, it was determined that a cavity was not formed, in the examples 1 to 13. It is thought that this was because the molar ratio of Cu added to the metal conductive paste for forming the internal electrode layers was 10% or more, and the diffusion of Cu in the metal conductive paste for forming the internal electrode layers into the internal electrode layers 12 was suppressed. The resistance to humidity, the reliability and the resistance to voltage were determined as good in the examples 1 to 13. It is thought that this was because the formation of the cavity was suppressed. Therefore, it was confirmed that the formation of the cavity was suppressed and the resistance to humidity, the reliability and the resistance to voltage were improved, when the molar ratio of Cu added to the metal conductive paste for forming the internal electrode layers was 10% or more. And, the tan δ ratios did not largely fluctuate and were maintained in the examples 1 to 13.

Figure 10:
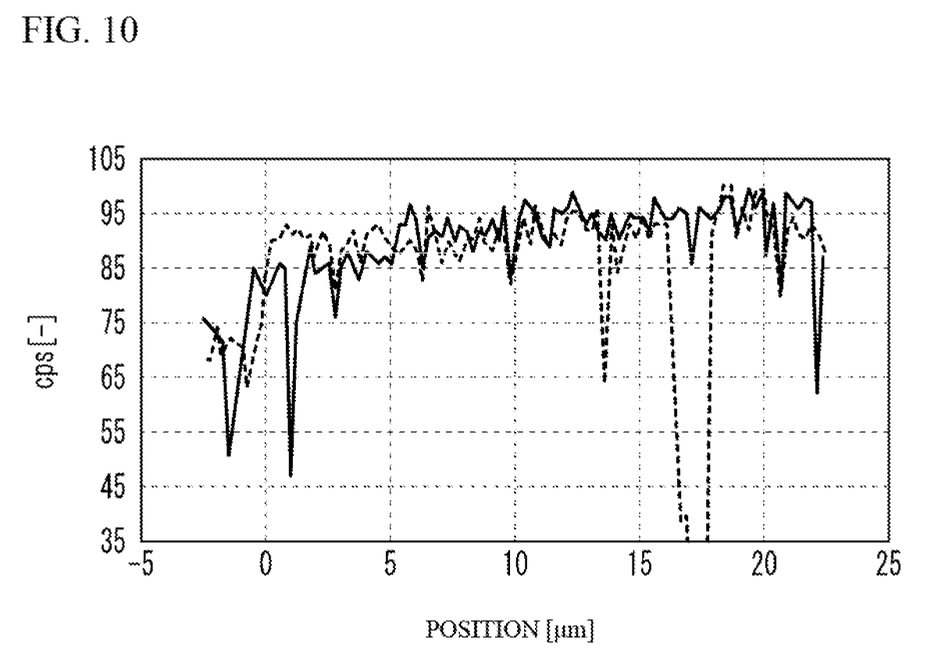
FIG. 10 illustrates an EDS line analysis result showing a detected amount of Cu in internal electrode layers in an example 10.

FIG. 10 illustrates an EDS line analysis result showing the detected amount of Cu in the internal electrode layers 12 in the example 10. In FIG. 10, a horizontal axis indicates a position from the end faces of the multilayer chip toward inside thereof. A vertical axis indicates a detected number of X-ray per one second. In FIG. 10, the result of FIG. 5 is also illustrated. As illustrated in FIG. 10, although Cu was mixed with the metal conductive paste for forming the internal electrode layers in advance, the detected amount of Cu of the example 10 was substantially the same as the result of FIG. 5, on the side of the internal electrode layers, as illustrated in FIG. 10. It is thought that this was because the diffusion of Cu into the internal electrode layers 12 was suppressed.

From the results, it was confirmed that very high resistance to voltage was achieved in the examples 3 to 7 in which the molar ratio of Cu was 15% to 33%. It is thought that this was because the molar ratio of Cu was 15% or more, the number of micro cavities was reduced and the very high resistance to voltage was achieved, although the melting point of the internal electrode layers was high on the lower limit side of the molar ratio of Cu, the internal electrode layers could not sufficiently moves in the firing process and the micro cavities were formed. On the other hand, it is thought that variation of the intervals of the dielectric layers 11 gets smaller and very high resistance to voltage is achieved when the molar ratio of Cu is 33% or less, although the melting point of the internal electrode layers gets lower on the upper limit side of the molar ratio of Cu, the internal electrode layers excessively move during the firing process, and the variation of the interval of the dielectric layers gets larger.

Electrostatic capacity ratios of the examples 1 to 12 were higher than that of the example 13. From the result, it is confirmed that the continuity modulus of the internal electrode layers 12 can be high when the molar ratio of Cu in the metal conductive paste for forming the internal electrode layers is 80% or less.

Although the embodiments of the present invention have been described in detail, it is to be understood that the various change, substitutions, and alterations could be made hereto without departing from the spirit and scope of the invention.

What is claimed is:

1. A ceramic electronic device comprising:
a multilayer chip having a structure in which each of a plurality of dielectric layers and each of a plurality of internal electrode layers are alternately stacked, a main component of the dielectric layers being ceramic, the multilayer chip having a rectangular parallelepiped shape, respective one ends of the plurality of internal electrode layers being alternately exposed to a first end face and a second end face of the multilayer chip, the first end face being opposite to the second end face,
a first external electrode provided on the first end face; and
a second external electrode provided on the second end face,
wherein a main component of the first external electrode and the second external electrode is a first metal,
wherein maximum thicknesses of the first external electrode and the second external electrode is 20 μm or less,
wherein the internal electrode layers include the first metal and a second metal of which a melting point is higher than that of the first metal,
wherein a diffusion coefficient of the first metal with respect to the second metal is larger than a diffusion coefficient of the second metal with respect to the first metal,
wherein a number of a first cavity in a range of 10 numbers of the internal electrode layers that are next to each other and are connected to a same external electrode of the first external electrode and the second external electrode is 1 or less,
wherein a length of the first cavity in a stacking direction of the 10 numbers of the internal electrode layers is equal to or more than each interval of the 10 numbers of the internal electrode layers in a connecting portion where the same external electrode is connected to the 10 numbers of the internal electrode layers,
wherein a molar percentage of the first metal in the internal electrode layers is 10 mol % or more and 90 mol % or less, wherein total moles of the first metal and the second metal in the internal electrode layers account for 100 mol %,
wherein a second cavity whose length in the stacking direction is less than the each interval of the 10 numbers of the internal electrode layers is formed between any two, which are immediately adjacent to each other in the stacking direction in the connecting portion, of the 10 numbers of the internal electrode layers.

2. The ceramic electronic device as claimed in claim 1, wherein the first metal is Cu,
wherein the second metal is Ni.

3. The ceramic electronic device as claimed in claim 1, wherein a molar percentage of the first metal in the internal electrode layers is 15 mol % or more and 66 mol % or less.

4. The ceramic electronic device as claimed in claim 1, wherein a molar percentage of the first metal in the internal electrode layers is 15 mol % or more and 33 mol % or less.

5. A circuit substrate comprising;
a ceramic electronic device as claimed in claim 1.

* * * * *